US009723252B2

(12) United States Patent
Choi et al.

(10) Patent No.: US 9,723,252 B2
(45) Date of Patent: Aug. 1, 2017

(54) IMAGE OUTPUTTING DEVICE

(71) Applicant: LG Electronics Inc., Seoul (KR)

(72) Inventors: Sooin Choi, Seoul (KR); Sogi Choi, Seoul (KR); Hyojung Lee, Seoul (KR); Hyunju Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/507,430

(22) Filed: Oct. 6, 2014

(65) Prior Publication Data

US 2015/0110460 A1    Apr. 23, 2015

(30) Foreign Application Priority Data

Oct. 22, 2013  (KR) .................. 10-2013-0126069

(51) Int. Cl.
*H04N 5/77* (2006.01)
*H04N 21/4223* (2011.01)
*H04N 9/79* (2006.01)
*H04N 7/14* (2006.01)
*H04N 5/222* (2006.01)
*G11B 27/00* (2006.01)

(52) U.S. Cl.
CPC ............. *H04N 5/772* (2013.01); *G11B 27/00* (2013.01); *H04N 5/222* (2013.01); *H04N 7/147* (2013.01); *H04N 9/79* (2013.01); *H04N 21/4223* (2013.01)

(58) Field of Classification Search
CPC ...... H04N 5/772; H04N 21/4223; H04N 9/79; H04N 7/147; G06K 9/00221; G06K 9/00335

USPC ................. 386/226, 223–224, 360, 228, 230
See application file for complete search history.

(56) References Cited

U.S. PATENT DOCUMENTS

| 4,992,891 | A  | * | 2/1991  | Komatsu ............. G11B 27/032 348/E5.056 |
| 5,802,226 | A  | * | 9/1998  | Dischert ............. G11B 27/032 348/E5.056 |
| 6,646,676 | B1 | * | 11/2003 | DaGraca ........... G06F 17/30805 340/541 |
| 2002/0073077 | A1 |   | 6/2002  | Lennon |
| 2004/0031377 | A1 | * | 2/2004  | Oshiyama ......... G06F 17/30749 84/602 |
| 2007/0036049 | A1 | * | 2/2007  | Im ........................ G11B 31/003 369/47.16 |
| 2008/0250457 | A1 | * | 10/2008 | Ohno ................. H04N 5/44543 725/58 |
| 2009/0060385 | A1 |   | 3/2009  | Kojo |

(Continued)

FOREIGN PATENT DOCUMENTS

CN    101378463 B    12/2010
CN    102100062 A     6/2011

(Continued)

*Primary Examiner* — Helen Shibru
(74) *Attorney, Agent, or Firm* — Birch, Stewart, Kolasch & Birch, LLP

(57) ABSTRACT

An image outputting device including a camera configured to obtain a viewer's image; a display configured to reproduce content; and a controller configured to perform a dual-recording function recording both the viewer's image and the content being reproduced, based on at least one of additional information corresponding to the content being reproduced and a result of analyzing the obtained viewer's image.

14 Claims, 27 Drawing Sheets

(56) References Cited

U.S. PATENT DOCUMENTS

| | | | | |
|---|---|---|---|---|
| 2009/0073253 | A1* | 3/2009 | Lee | H04N 7/147 |
| | | | | 348/14.04 |
| 2009/0074388 | A1* | 3/2009 | Hashimoto | G11B 7/24038 |
| | | | | 386/326 |
| 2009/0280897 | A1 | 11/2009 | Fitzmaurice et al. | |
| 2010/0008639 | A1 | 1/2010 | Greenberg et al. | |
| 2012/0194645 | A1 | 8/2012 | Fuller et al. | |
| 2012/0257035 | A1 | 10/2012 | Larsen | |
| 2012/0293705 | A1 | 11/2012 | Su | |
| 2013/0011121 | A1 | 1/2013 | Forsyth et al. | |
| 2013/0342731 | A1* | 12/2013 | Lee | H04N 5/23293 |
| | | | | 348/231.4 |
| 2014/0232921 | A1* | 8/2014 | Kim | H04N 5/2258 |
| | | | | 348/333.05 |

FOREIGN PATENT DOCUMENTS

| | | |
|---|---|---|
| CN | 102446065 A | 5/2012 |
| CN | 103141085 A | 6/2013 |

* cited by examiner

FIG. 3
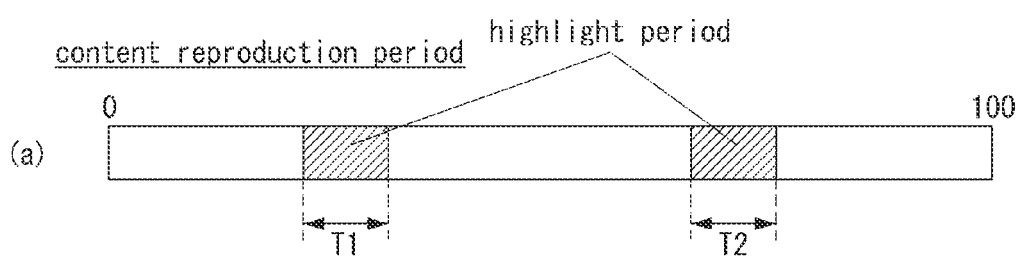
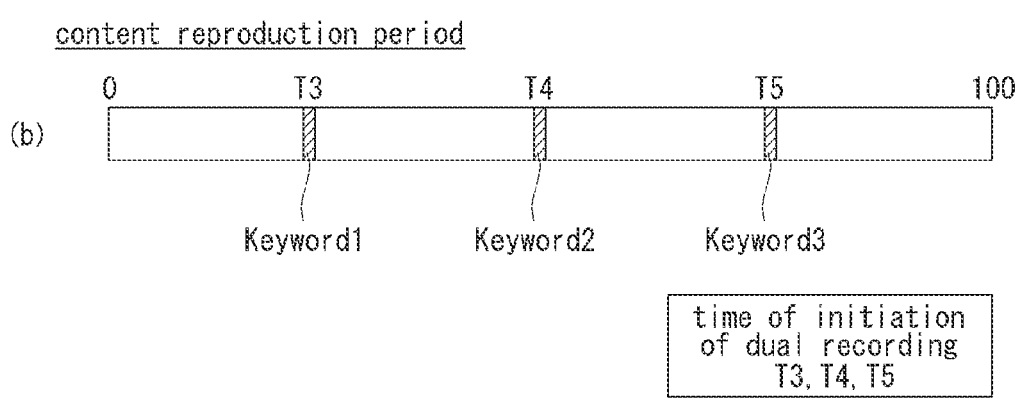

FIG. 11
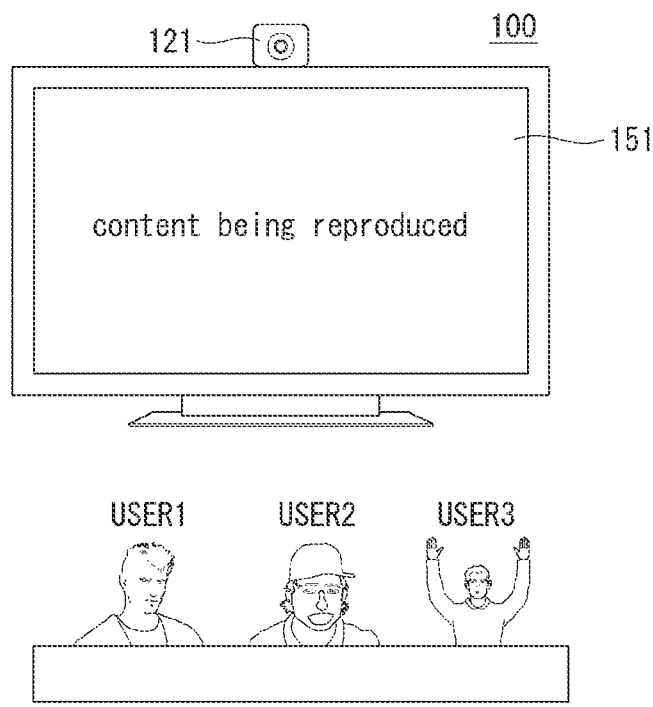
1. dual recording CASE1: USER1: registered viewer
2. dual recording CASE2: USER2: smiling viewer
3. dual recording CASE3: USER3: viewer raising both hands

FIG. 14
(a) example of storing result of performing dual recording
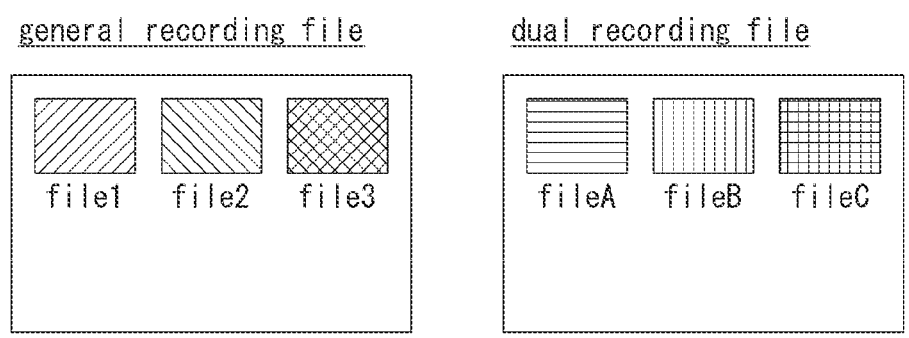
(b) configuration example of file stored as result of performing dual recording
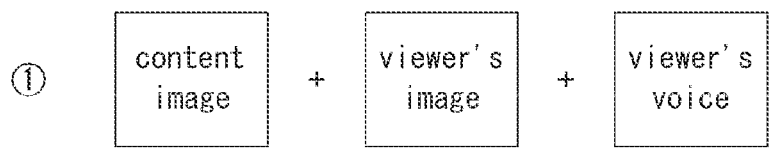
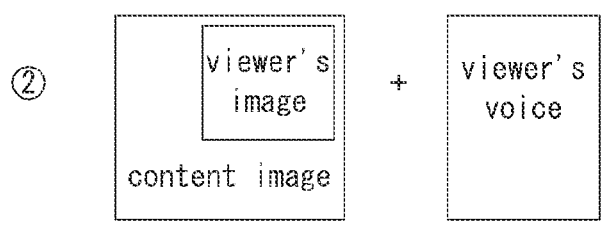

FIG. 20
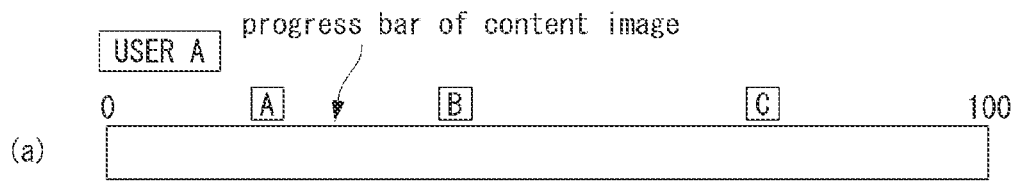
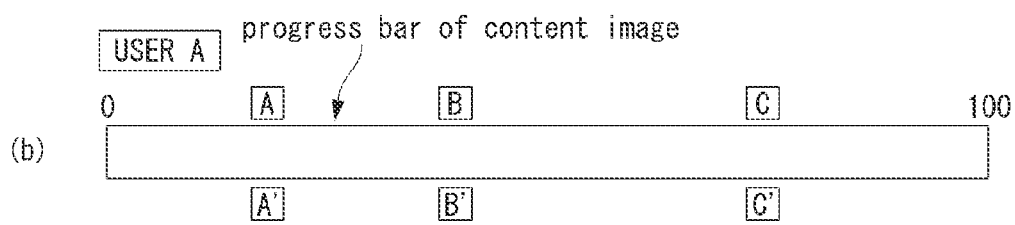
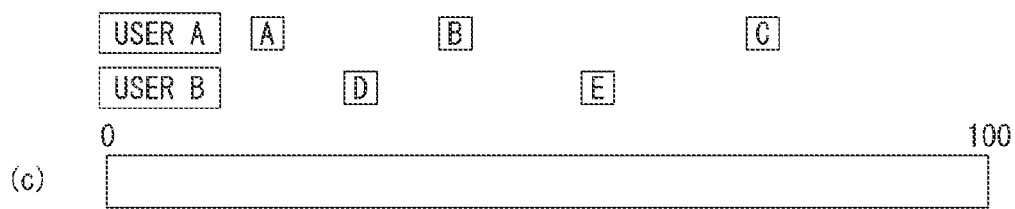

FIG. 21
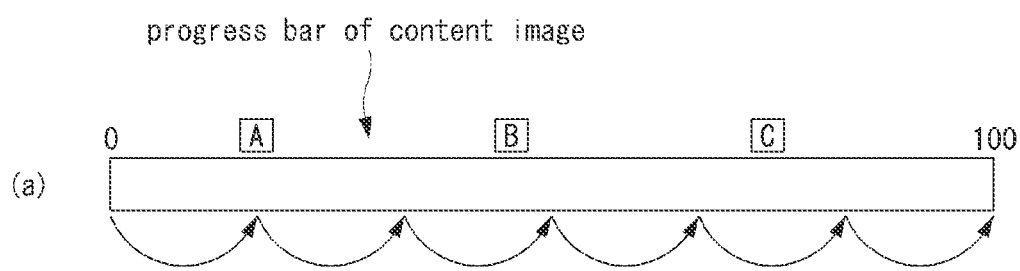
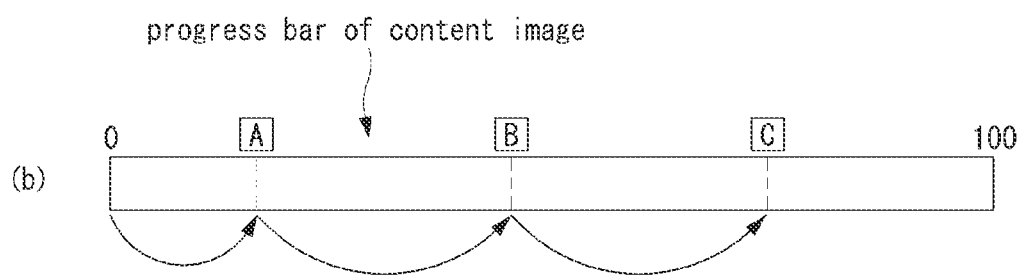

IMAGE OUTPUTTING DEVICE

CROSS-REFERENCE TO RELATED APPLICATIONS

Pursuant to 35 U.S.C. §119(a), this application claims the benefit of earlier filing date and right of priority to Korean Patent Application No. 10-2013-0126069, filed on Oct. 22, 2013, the contents of which are incorporated by reference herein in their entirety.

BACKGROUND OF THE INVENTION

Field of the Invention

The present invention relates to an image outputting device, and more specifically, to an image outputting device that can record content being reproduced, together with a viewer's image.

Discussion of the Related Art

An image outputting device such as a TV reproducing content also provides a function for recording content in addition to general programming. Further, Internet Protocol Televisions (IPTVs) or other bi-directional communication broadcasts are also now actively in service. However, the interaction between the image outputting devices and the user is limited and often inconvenient for the user.

SUMMARY OF THE INVENTION

Accordingly, one object of the present invention is to address the above-noted and other problems of the related art.

Another object of the present invention is to provide an image outputting device and corresponding method for providing a "dual-recording" function for performing recording on both a viewer's image and content being reproduced.

Yet another object of the present invention is to provide an image outputting device and corresponding method for providing various functions using the data stored as a result of performing the dual-recording function.

To achieve these and other advantages and in accordance with the purpose of the present invention, as embodied and broadly described herein, the present invention provides in one aspect an image outputting device including a camera configured to obtain a viewer's image; a display configured to reproduce content; and a controller configured to perform a dual-recording function recording both the viewer's image and the content being reproduced, based on at least one of additional information corresponding to the content being reproduced and a result of analyzing the obtained viewer's image. The present invention also provides a corresponding method of controlling the image outputting device.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIGS. 3 and 4 are overviews illustrating an example of performing a dual-recording function as shown in FIG. 2;

FIGS. 11 and 12 are overviews illustrating various forms of the dual-recording function performed in an image outputting device according to an embodiment of the present invention when a plurality of viewers are recognized;

FIG. 14 is an overview illustrating an example of storing a result of performing a dual-recording function in an image outputting device according to an embodiment of the present invention;

FIG. 20 is an overview illustrating various examples of indicating a dual-recording function targeting a plurality of viewers in an image outputting device according to an embodiment of the present invention;

FIG. 21 is an overview illustrating example searching functions provided from an image outputting device according to an embodiment of the present invention;

DETAILED DESCRIPTION

Figure 1:
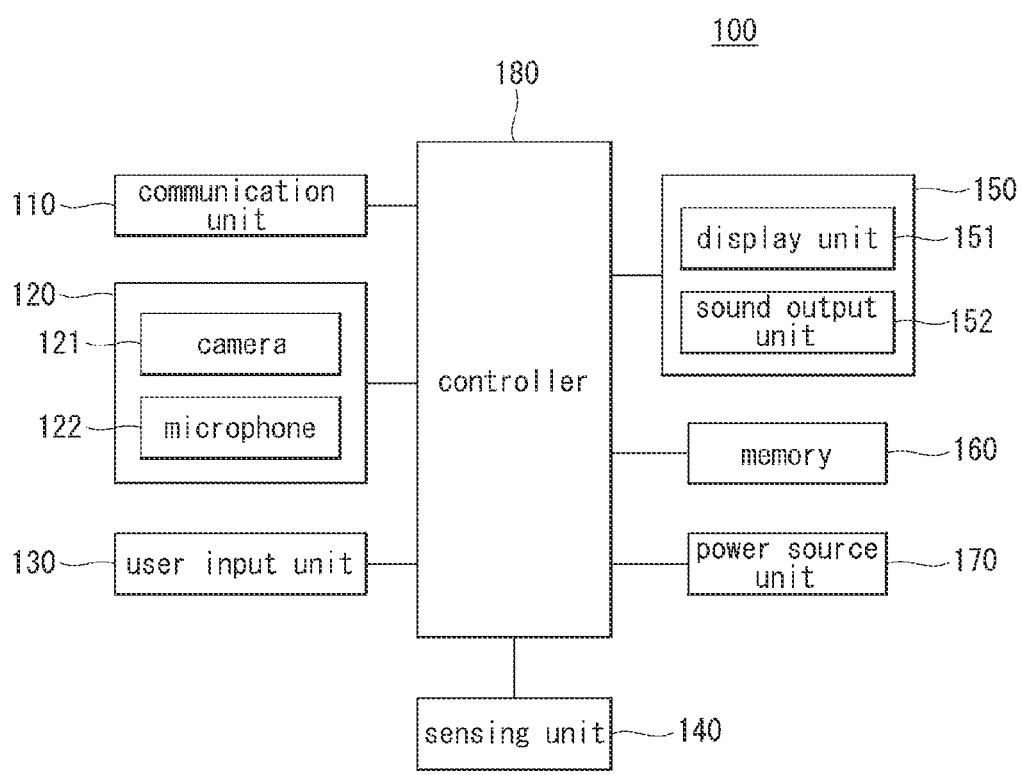
FIG. 1 is a block diagram illustrating an image outputting device according to an embodiment of the present invention.

The foregoing objects, features, and advantages of the present invention may be apparent from the following detailed description taken in conjunction with the accompanying drawings. Hereinafter, preferred embodiments of the present invention will be described with reference to the drawings. The same reference numerals are used to denote the same elements throughout the specification.

FIG. 1 is a block diagram illustrating an image outputting device 100 according to an embodiment of the present invention. The image outputting device described herein may include a TV, a PC, a digital signage device, etc. However, the scope of the present invention is not limited thereto.

Referring to FIG. 1, the image outputting device 100 includes a communication unit 110, an input unit 120, a user input unit 130, a sensing unit 140, an output unit 150, a memory 160, a power source unit 170, and a controller 180. The image outputting device 100 may include more or less components than those shown in FIG. 1.

The communication unit 110 may include one or more modules that enable wired/wireless communication between the image outputting device 100 and a communication network. For example, the communication unit 110 may include a broadcast receiving module, a mobile communication module, a wireless Internet module, and a near-field communication module. The communication unit 110 may receive a broadcast signal through the communication network.

The input unit 120 is the component for obtaining an audio signal or video signal input from an outside source, and as shown in FIG. 1, may include a camera 121 and a microphone 122. The camera 121 processes an image frame such as a still image or motion image obtained by an image sensor in a video call mode or image capturing mode. Further, the microphone 122 receives an external voice signal and processes it into electrical voice data.

In addition, the user input unit 130 generates input data for a user to control the operation of the image outputting device 100. The user input unit 130 may include a key pad, a dome switch, a touchpad (resistive/capacitive), a jog wheel, a jog switch, etc.

The sensing unit 140 can sense the current state of the image outputting device 100 or the user's state and sense an ambient environment state of the image outputting device 100. The data sensed by the sensing unit 140 may be used for controlling the operation of the image outputting device 100.

The output unit 150 can output an image signal and a video signal of content reproduced under the control of the controller 180. As shown in FIG. 1, the output unit 150 may include a display unit 151 and a sound output unit 152.

In addition, the display unit 151 displays and outputs the information processed by the image outputting device 100. The display unit 151 may be implemented as a liquid crystal display, a thin film transistor-liquid crystal display, an organic light emitting diode display, or a flexible display. The display unit 151 may include a display outputting images and a polarized film filtering an image with a predetermined polarized angle and outputting it.

Further, the display unit 151 can output an image according to a polarized glasses scheme or a shutter-glass scheme in order for the user to recognize a 3D stereoscopic image. However, the schemes for implementing 3D stereoscopic images are not limited to the above examples.

In addition, the sound output unit 152 outputs a sound signal associated with a function performed by the image outputting device 100. Such sound output unit 152 may include a receiver, a speaker, a buzzer, etc. Further, the sound output unit 152 may output a sound through an earphone jack.

The memory 160 can store a program for the operation of the controller 180 and temporarily or permanently retain input/output data. The memory 160 can also temporarily or permanently store image data output through the display unit 151 and sound data corresponding thereto.

The memory 160 may include at least one-type storage medium of a flash-type memory, a hard disc-type memory, a multimedia card micro-type memory, a card-type memory (e.g., an SD or XD memory), a RAM (Random Access Memory), an SRAM (Static Random Access Memory), a ROM (Read-Only Memory), an EEPROM (Electrically Erasable Programmable Read-Only Memory), a PROM (Programmable Read-Only Memory), a magnetic memory, a magnetic disc, and an optical disc. The image outputting device 100 may be operated in association with a web storage performing the storage function of the memory 160 over the Internet.

In addition, the controller 180 generally controls the overall operation of the image outputting device 100. That is, the controller 180 can control the operation of each component of the image outputting device 100. As a specific example, the controller 180, when performing a dual-recording function for recording a viewer's image simultaneously with the content being reproduced, can control the display unit 151 and the sound output unit 152 in order to reproduce the content, control the camera 121 in order to obtain the viewer's image, and control the memory 160 in order to store the dual-recording function. The controller 180 may also include a plurality of sub control units for performing specified functions, respectively.

In addition, the power source unit 170 can receive internal or external power under the control of the controller 180 and supply power used for operating the components.

Various embodiments as described herein may be implemented in a recording medium that may be read by a computer or a similar device using, e.g., software, hardware, or combinations thereof. When implemented in hardware, the embodiments described herein may be realized using at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, micro-controllers, micro-processors, and electrical units for performing the functions. In some cases, such embodiments may be implemented by the controller 180.

When implemented in software, the embodiments such as procedures or functions may be realized alongside a separate software module that enables at least one function or operation. The software codes may be implemented by a software application written in a proper programming language. Further, the software codes may be stored in the memory 160 and may be executed by the controller 180.

Figure 2:
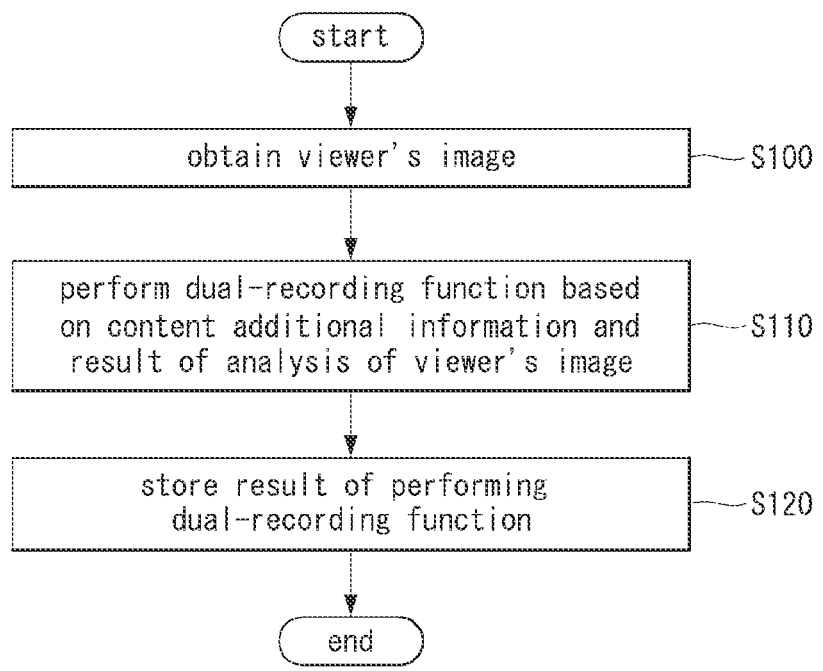
FIG. 2 is a flowchart illustrating a method for performing a dual-recording function in an image outputting device according to an embodiment of the present invention.

Next, FIG. 2 is a flowchart illustrating a method for performing a dual-recording function in an image outputting device according to an embodiment of the present invention. The concept of dual recording will first be described. In more detail, the image outputting device 100 according to an embodiment of the present invention offers a dual-recording function that can obtain and record the viewer's image together with the content being reproduced.

The dual-recording function may be conducted with the viewer's image being recorded while the content being reproduced is also being recorded. The dual-recording function may also be performed by starting the recording of the viewer's image simultaneously with starting the recording of the content being reproduced when a specific condition is met.

As shown in FIG. 2, in order to perform the dual-recording function, the controller 180 controls the camera 121 to obtain the viewer's image (S100). The controller 180 then performs the dual-recording function based on a result of analysis of the viewer's image and additional information of the content being reproduced (S110).

Specific examples in which the dual-recording function is performed will now be described. In particular, the controller 180 can perform the dual-recording function based on a highlight period contained in the additional information of the content being reproduced. For example, the period during which the dual-recording function is performed may be the same as a highlight period of the content being reproduced, part of the highlight period, or the highlight period plus a predetermined period coming before or after the highlight period.

In addition, the controller 180 can analyze caption information contained in the additional information of the content being reproduced, and as a result, perform the dual-recording function based on a time corresponding to a specific word contained in the caption information. The word, as the basis for performing the dual-recording function, may be designated by the user. There are a plurality of words that can be the basis for performing the dual-recording function.

Further, when the viewer makes a specific facial expression, the controller 180 can perform the dual-recording function. For example, when as a result of analyzing the viewer's image obtained by the camera 121, the user makes a facial expression corresponding to a specific facial expression such as smiling or crying, the controller 180 can perform the dual-recording function. Here, the period during which the dual-recording function is performed may be a period after such specific facial expression has been sensed.

Further, when the result of analyzing the viewer's image obtained by the camera 121 indicates the viewer makes a predetermined specific gesture, the controller 180 can perform the dual-recording function. Also, the period during which the dual-recording function is performed may be a predetermined period after such specific gesture has been recognized.

Referring again to FIG. 2, the controller 180 stores a result of performing the dual-recording function in the memory 160 (S120). Here, the controller 180 can combine the recorded viewer's image and the recorded content image obtained as the result of performing the dual-recording function and store the combined result as a single image. In contrast, the controller 180 can also store the recorded content image independently from the recorded viewer's image. Such storing operations may also be varied depending on the user's configurations.

Figure 4:
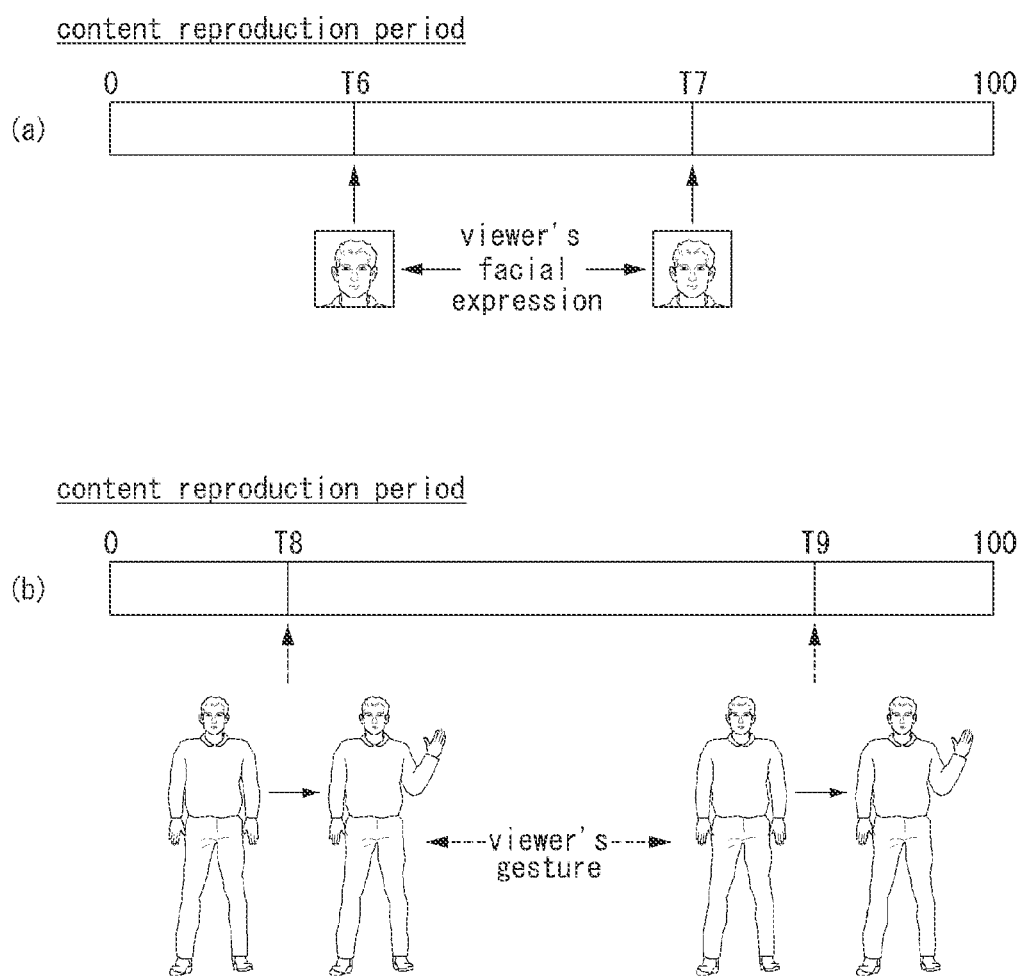

Next, FIGS. 3 and 4 are overviews illustrating an example of performing a dual-recording function as shown in FIG. 2. As shown in FIG. 3(*a*), the image outputting device 100 can perform a dual-recording function during the periods T1 and T2 that are highlight periods among the content reproduction periods. Further, the controller 180 can recognize the highlight periods of the content based on the additional information of the content being reproduced. The image outputting device 100 can also perform the dual-recording function during a specific period designated by the user.

As shown in FIG. 3(*b*), the image outputting device 100 can initiate dual recording when predetermined keywords are recognized. Such keywords may be designated by the user. Further, the controller 180 can previously recognize when the keywords are recognized by analyzing the additional information of the content.

As shown in FIG. 4(*a*), the image outputting device 100 can perform the dual-recording function when the viewer smiles. The controller 180 can also perform the dual-recording function when the user frowns or makes a serious or crying look. As shown in FIG. 4(*b*), the controller 180 can perform the dual-recording function when the user makes a gesture such as raising his or her right hand. However, the gesture for performing the dual-recording function is not limited thereto. Further, the viewer can configure a gesture for performing the dual-recording function.

Figure 5:
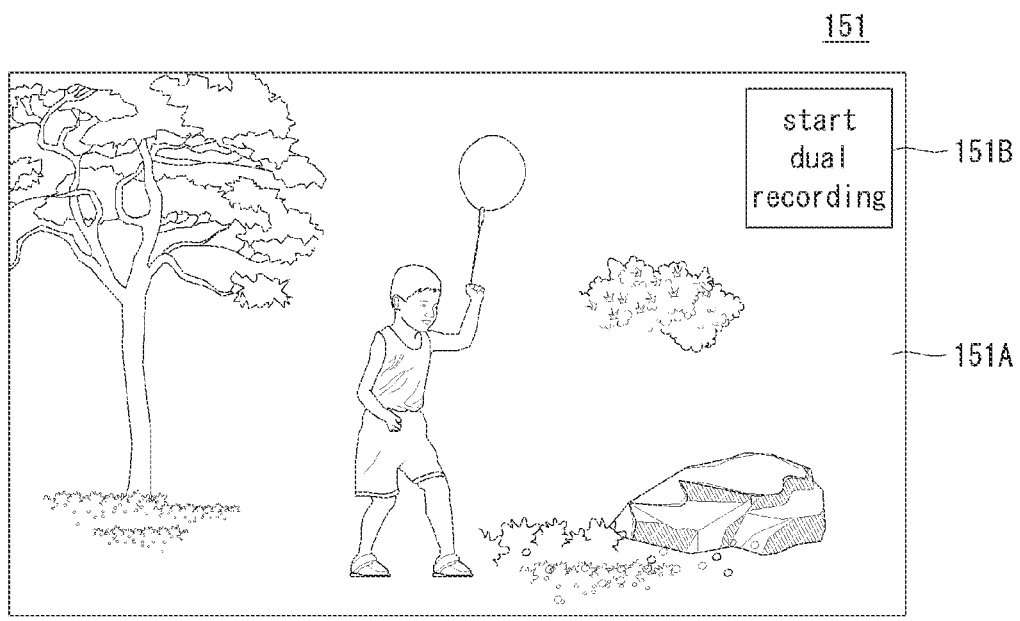
FIGS. 5 to 7 are overviews illustrating example user interfaces provided while a dual-recording function is performed in an image outputting device according to an embodiment of the present invention.
Figure 6:
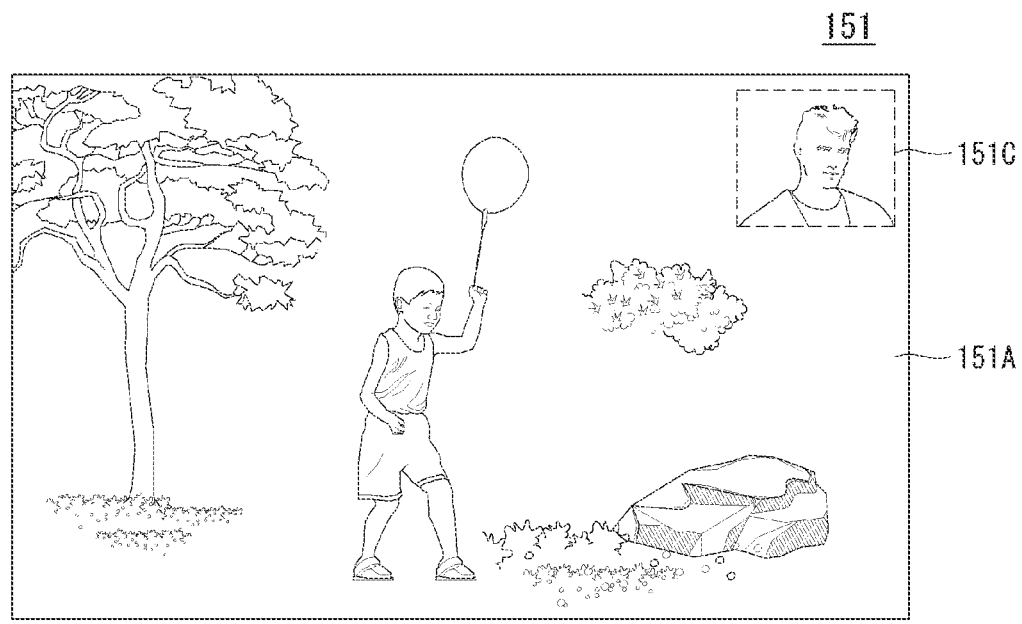
Figure 7:
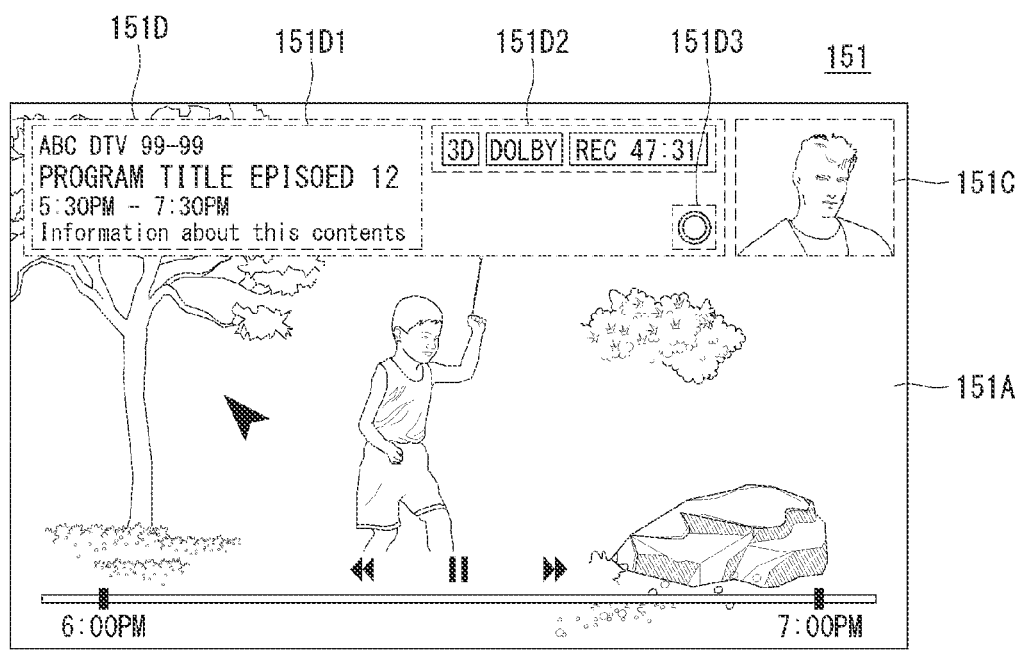

Next, FIGS. 5 to 7 illustrate example user interfaces provided while a dual-recording function is performed in the image outputting device 100 according to an embodiment of the present invention. As shown in FIG. 5, the image outputting device 100 can display a message 151B indicating the start of the dual recording on an image 151A of the content being reproduced, when the dual-recording function is initiated.

As shown in FIG. 6, while the dual-recording function is performed, the viewer's image 151C can be displayed on the image 151A of the content being reproduced in the image outputting device 100 in the form of PIP (Picture In Picture). Further, the image outputting device 100 may display the viewer's image 151C on the display unit 151 even when the dual-recording function is not performed. Then, the viewer can view the content while watching their picture.

As shown in FIG. 7, while performing the dual-recording function, the image outputting device 100 can display an information providing region 151D based on the user's manipulation. As shown, information 151D1 relating to the content being reproduced and an icon 151D2 indicating that the dual-recording function is being performed may be included in the information providing region 151D. A dual-recording ON/OFF/PAUSE button 151D3 can also be provided.

Figure 8:
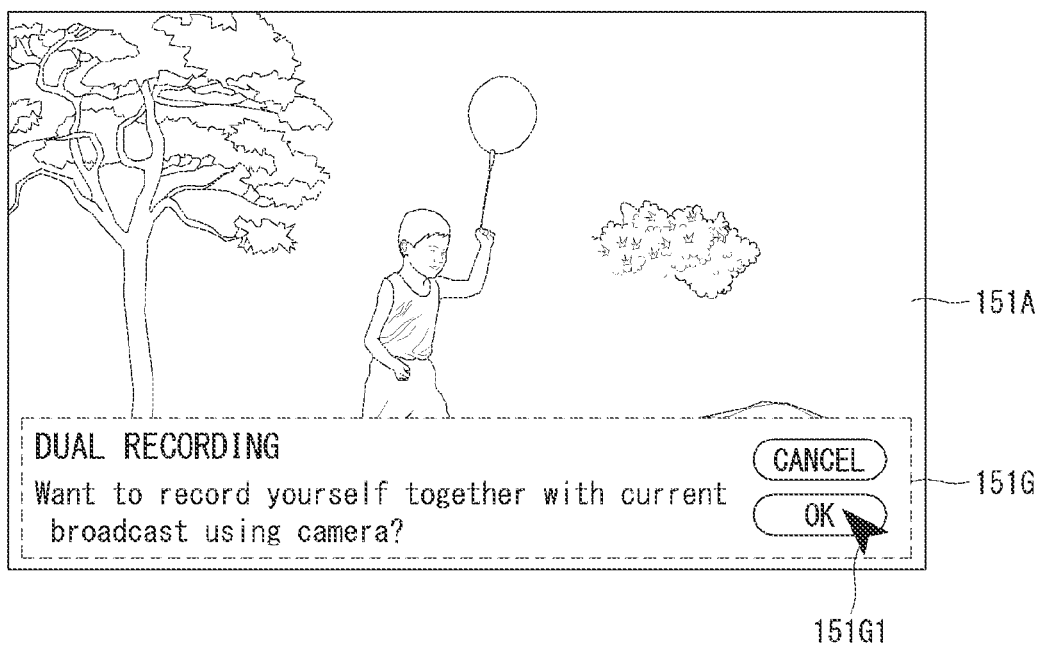
FIG. 8 is an overview illustrating a method of performing a dual-recording function based on a user's manipulation in an image outputting device according to an embodiment of the present invention.

Next, FIG. 8 is an overview illustrating performing a dual-recording function based on a user's manipulation in the image outputting device 100 according to an embodiment of the present invention. As shown, the controller 180 can display on the display unit 151 a message providing window 151G for identifying whether the dual-recording function is performed. If the user chooses a dual-recording function button using a cursor 151G1 controlled by a remote controller, for example, the dual-recording function can be executed. That is, the image outputting device 100 can automatically perform the dual-recording function based on the user's facial expression, gesture, or additional information, and also perform the dual-recording function based on the user's manipulation.

Figure 9:
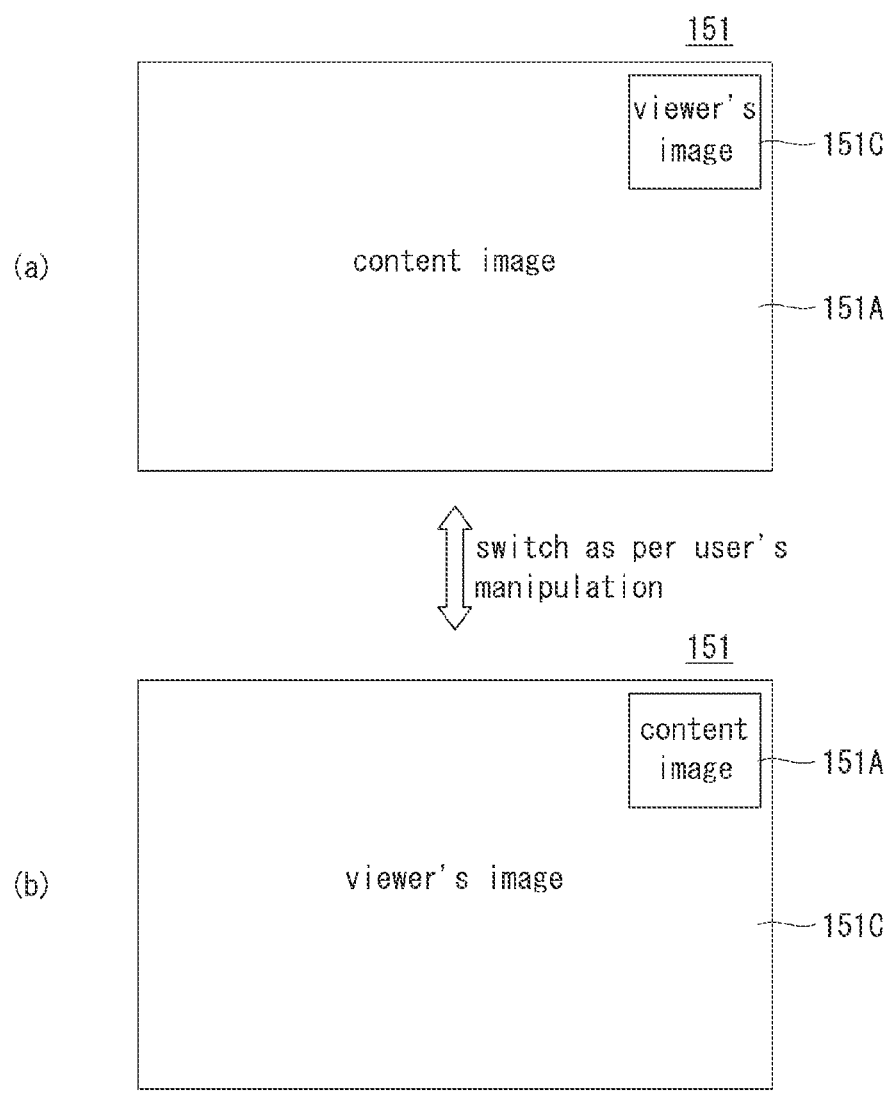
FIG. 9 is an overview illustrating a content image and a viewer's image provided in an image outputting device according to an embodiment of the present invention while a dual-recording function is performed.

Next, FIG. 9 is an overview illustrating a content image and a viewer's image provided in the image outputting device 100 according to an embodiment of the present invention while a dual-recording function is performed. As shown in FIGS. 9(a) and (b), the image outputting device 100 can display the viewer's image 151C on the image 115 LA of the content being reproduced and also display the image 151A of the content being reproduced on the viewer's image 151C in the form of PIPs. The image outputting device 100 can also switch displaying the two forms based on the user's manipulation.

In addition, the method of providing the image 151A of the content being reproduced and the viewer's image 151C in the image outputting device 100 is not limited to that shown in FIG. 9. For example, the image outputting device 100 can set up the region of displaying the image of the content being reproduced and the region of displaying the viewer's image separately from each other.

Figure 10:
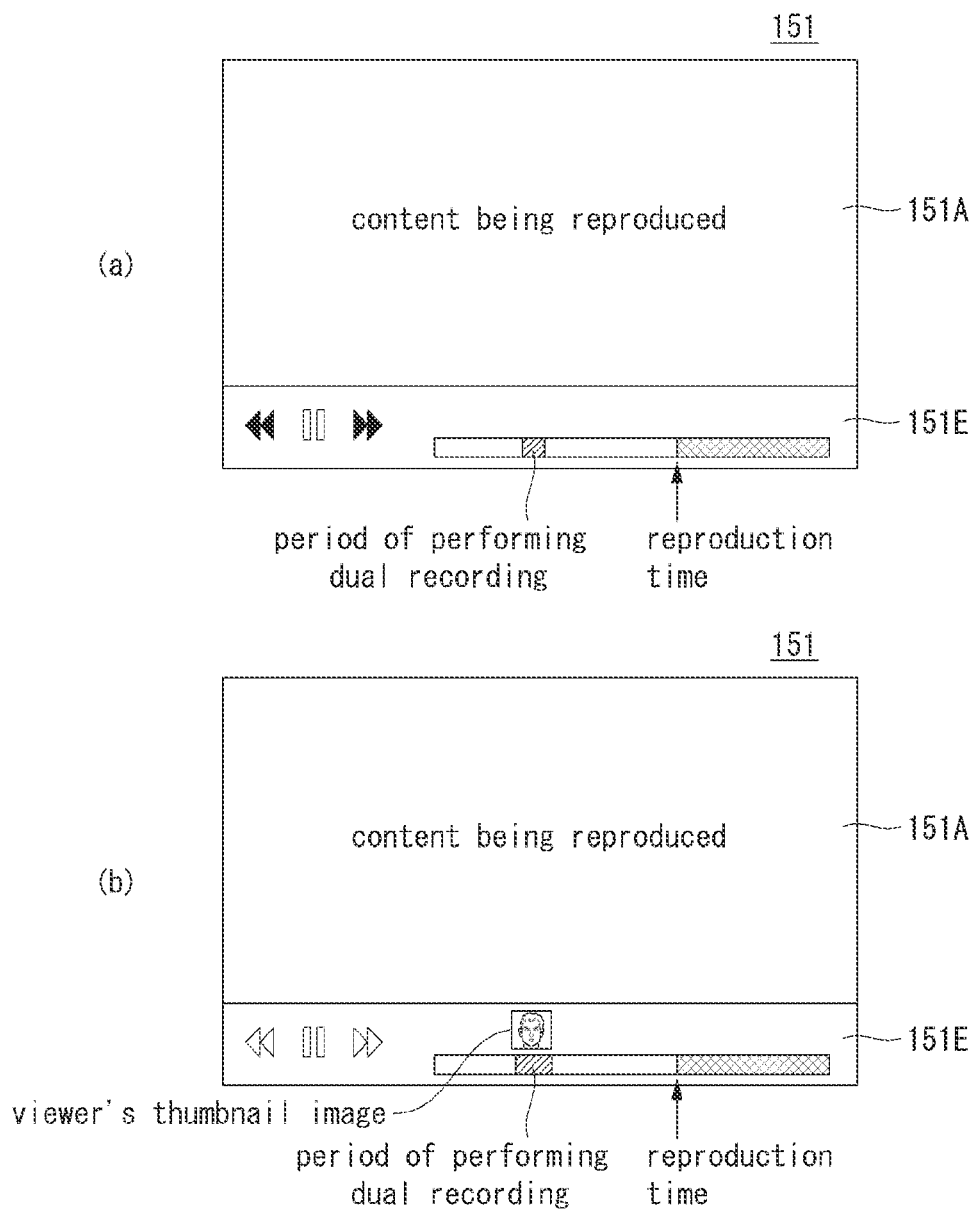
FIG. 10 is an overview illustrating examples of providing an indication indicating that a dual-recording function is performed in an image outputting device according to an embodiment of the present invention.

Next, FIG. 10 is an overview illustrating examples of providing an indication indicating that a dual-recording function is performed in an image outputting device 100 according to an embodiment of the present invention. As shown in FIG. 10(a), the image outputting device 100 displays a period during which the dual recording has been performed on a progress bar included in a control region 151E corresponding to the content being reproduced.

As shown in FIG. 10(b), the image outputting device 100 provides a thumbnail image of the viewer on a region adjacent to the period during which the dual-recording function has been performed in the progress bar included in the control region 151E corresponding to the content. That is, the image outputting device 100, as described above in connection with FIG. 10, can display an indication for indicating a time or period when the dual-recording function is performed, in association with the control region 151E corresponding to the content being reproduced.

Further, when the dual-recording function has been performed on a plurality of viewers, the image outputting device 100 can provide separate indications for the viewers, respectively. For example, the image outputting device 100 can distinguish a first viewer and a second viewer using different colors or display positions corresponding to the first viewer and the second viewer, respectively.

Figure 12:
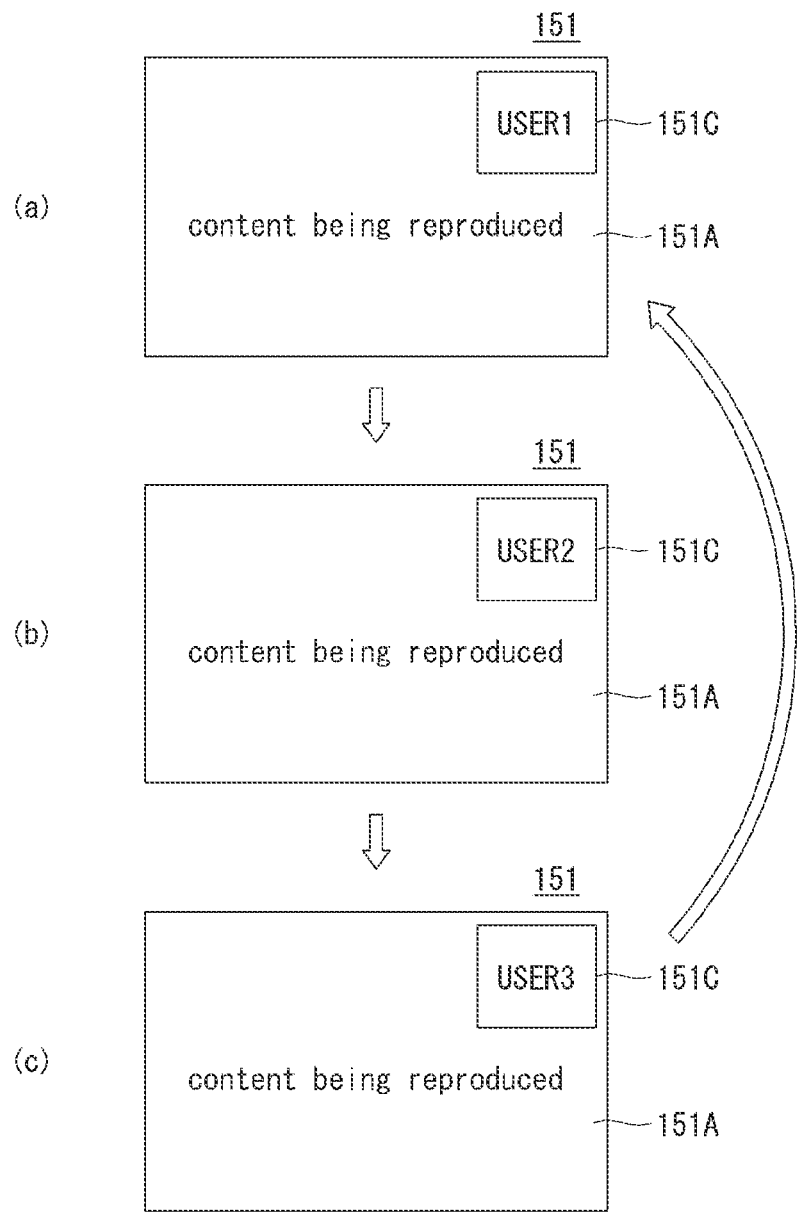

Next, FIGS. 11 and 12 are overviews illustrating various forms of the dual-recording function performed in the image outputting device 100 according to an embodiment of the present invention when a plurality of viewers are recognized. Further, the controller 180 can analyze the viewer's images obtained through the camera 121 to recognize that a plurality of viewers USER1, USER2, and USER3 view a TV 100.

When the plurality of viewers USER1, USER2, and USER3 are recognized, the controller 180 can perform the dual-recording function only on a viewer previously registered (CASE 1). Alternatively, the controller 180 can perform the dual-recording function on a viewer USER2 making a 'smiling face' as predetermined among the plurality of viewers USER1, USER2, and USER3 (CASE2), or perform the dual-recording function on a viewer USER3 raising both hands as a predetermined gesture among the plurality of viewers USES1, USER2, and USER3 (CASE 3).

In addition, as shown in FIG. 12, the controller 180 can alternately perform the dual-recording function on the plurality of viewers USES1, USER2, and USER3 (CASE 4). In such case, the controller 180 can alternately provide images for the plurality of viewers USER1, USER2, and USER3, respectively, through the display unit 151.

Figure 13:
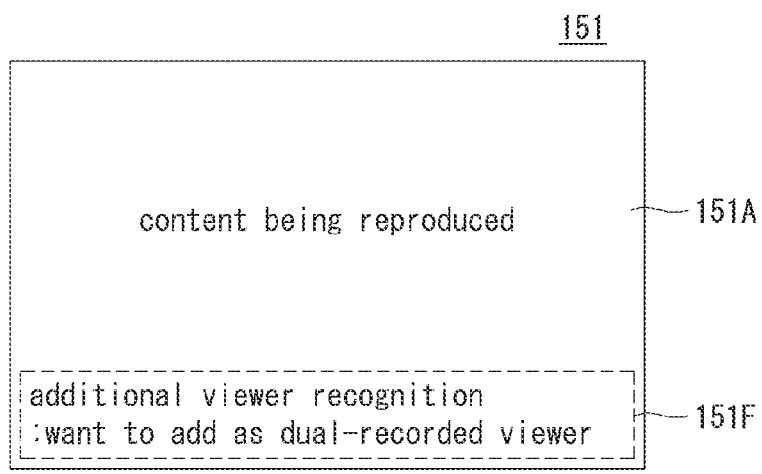
FIG. 13 is an overview illustrating a message provided from an image outputting device according to an embodiment of the present invention when an additional viewer is recognized.

Next, FIG. 13 is an overview illustrating a message provided from the image outputting device 100 according to an embodiment of the present invention when an additional viewer is recognized. As shown in FIG. 13, when an additional viewer is recognized, the controller 180 of the image outputting device 100 can provide a message 151F inquiring about whether to add the additionally recognized viewer to be subjected to the dual-recording function. In addition, the controller 180 can also immediately add the additionally recognized viewer to be subjected to the dual-recording function without the message 151F or disregard the additionally recognized viewer.

Next, FIG. 14 is an overview illustrating an example of storing a result of performing a dual-recording function in the image outputting device 100 according to an embodiment of the present invention. As shown in FIG. 14(a), the image outputting device 100 can assign a general recording file and a dual recording file in different storage locations, respectively.

As shown in FIG. 14(b), the file generated as a result of performing the dual-recording function includes a content image, a viewer's image, and the viewer's voice as stored in the forms independent from each other. Further, the file generated as the result of performing the dual-recording function includes the content image and the viewer's image combined with each other and the viewer's voice. An external sound signal may also be recorded instead of the viewer's voice or together with the viewer's voice.

Meanwhile, the viewer's voice is obtained through the microphone 122 while the dual-recording function is performed and is preferably stored separately from the content sound. This is why upon viewing the content, the main target for recording is not the viewer's voice but the sound signal of the content.

Figure 15:
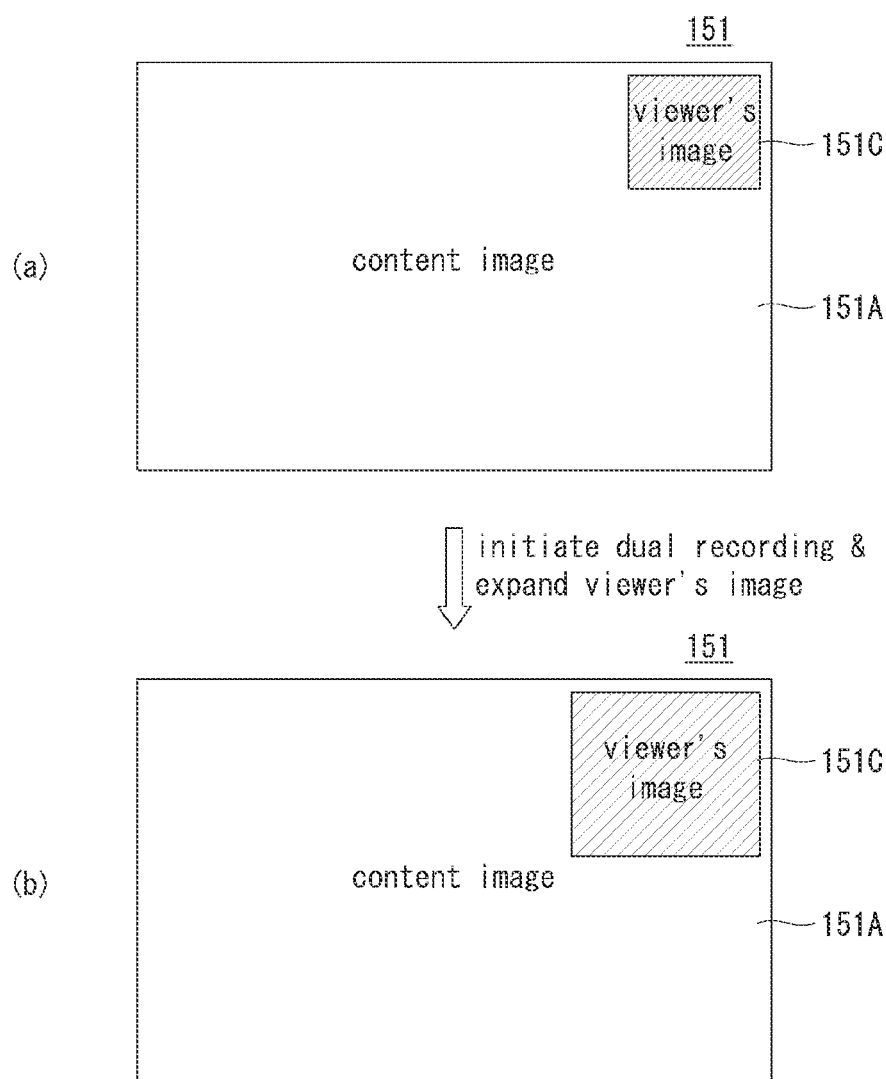
FIGS. 15 and 16 are overviews illustrating examples of changing forms of displaying viewer's images in an image outputting device according to an embodiment of the present invention when a dual-recording function is performed.
Figure 16:
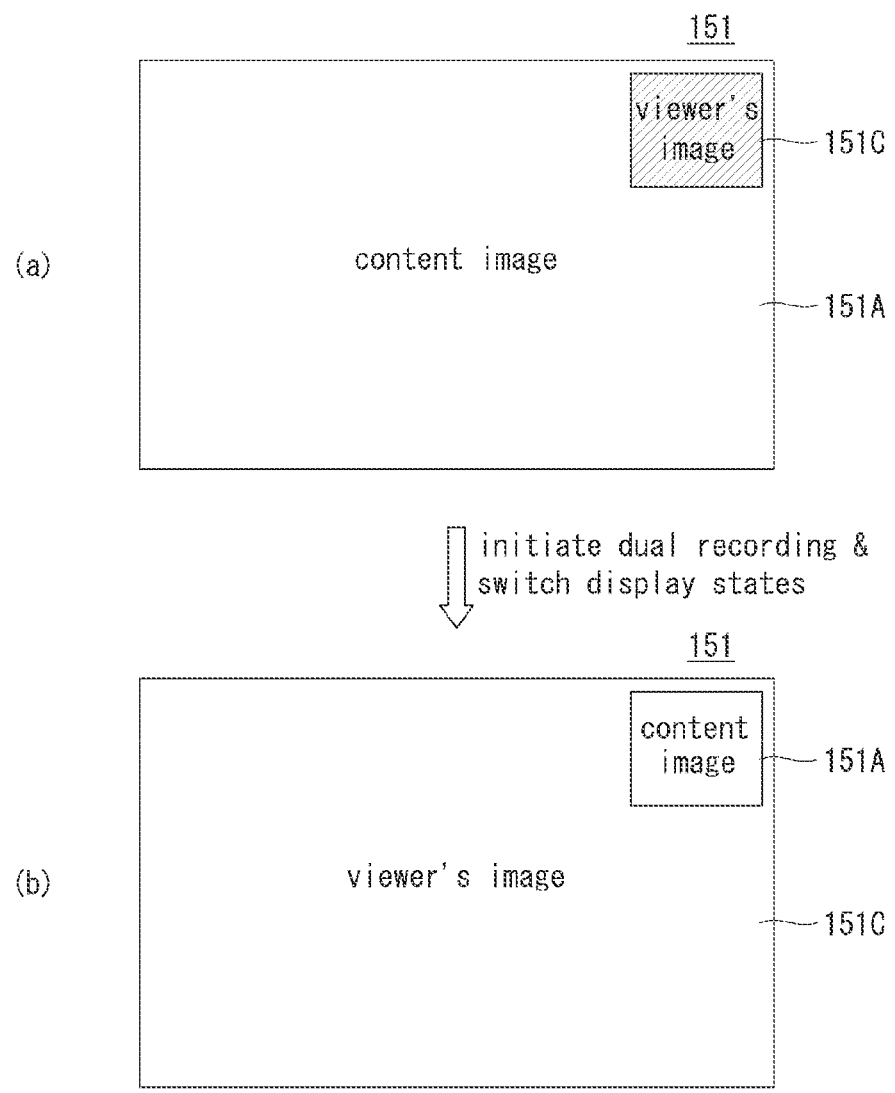

Next, FIGS. 15 and 16 are overviews illustrating examples of changing the forms of displaying viewer's images in the image outputting device 100 according to an embodiment of the present invention when a dual-recording function is performed. As shown in FIG. 15, the image outputting device 100 can expand and display the viewer's image 151C, when the dual-recording function is initiated. Then, the viewer can intuitively recognize the dual recording is initiated. In addition, the time during which the viewer's image 151C is expanded and displayed may be predetermined.

As shown in FIGS. 16(a) and (b), the image outputting device 100 can primarily display the viewer's image 151C at the time of the dual recording being initiated and secondarily display the image 151A of the content being reproduced. For example, the image outputting device 100 can display the image 151A of the content being reproduced in the form of PIP for the viewer's image 151C for a predetermined time after the dual recording has been initiated.

Figure 17:
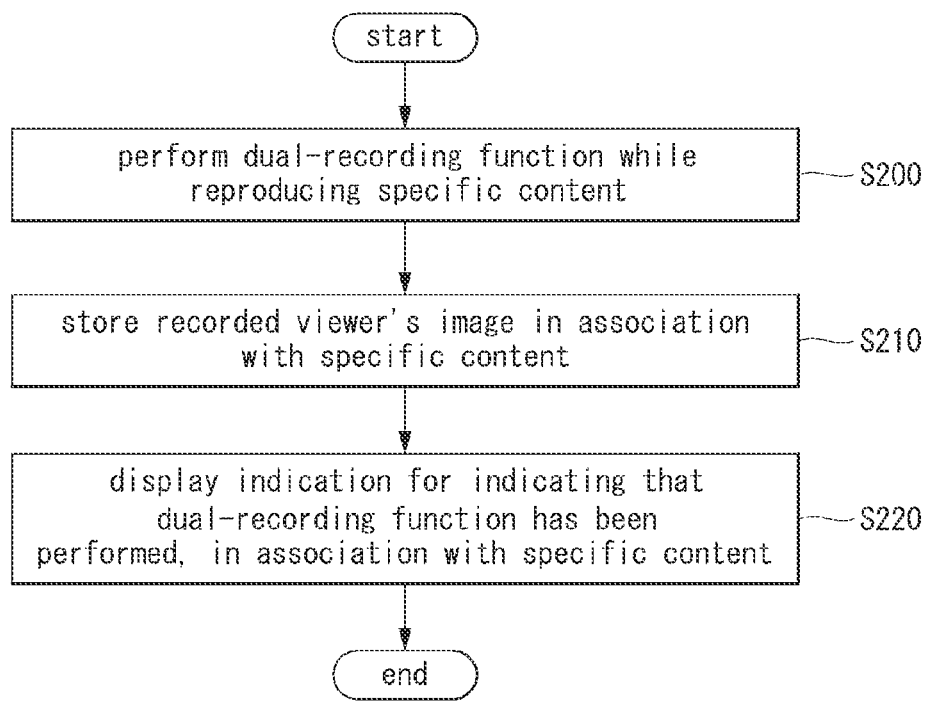
FIG. 17 is a flowchart illustrating a method of performing a dual-recording function in an image outputting device according to an embodiment of the present invention.

Next, FIG. 17 is a flowchart illustrating a method of performing a dual-recording function on specific content in an image outputting device and reproducing the specific content according to an embodiment of the present invention. As shown, while the specific content is being reproduced, the dual-recording function is performed (S200). As described above, the dual-recording function may be initiated by the user's manipulation or may be automatically initiated based on additional information on the specific content or a user's facial expression or gesture.

If the dual-recording function is performed, the controller 180 associates the recorded viewer's image with the specific content and stores the associated result in the memory 160 (S210). Storing the recorded viewer's image in association with the specific convent may include temporal syncing between the obtained data and assigning association between the obtained data.

When the recorded viewer's image is stored associated with the specific content and the specific content is then displayed or reproduced, the controller 180 can display an indication on the display unit 151 indicating that the dual-recording function has been performed while the specific content is reproduced (S220).

Figure 18:
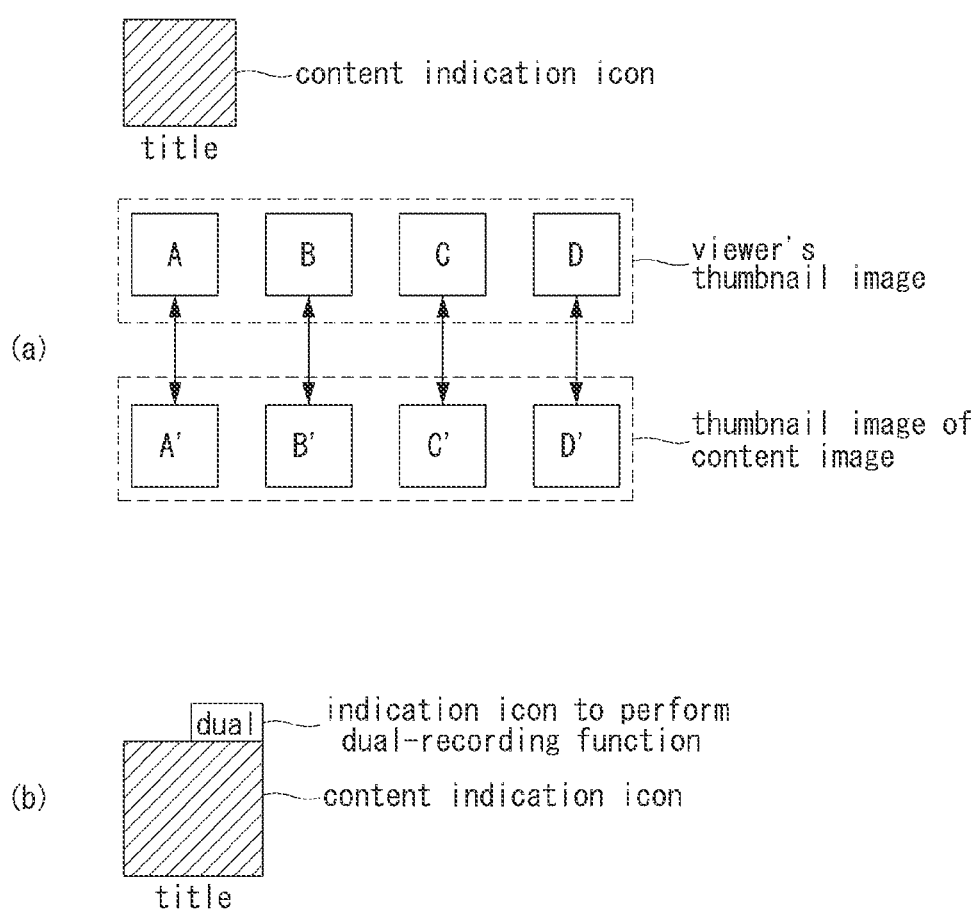
FIG. 18 is an overview illustrating examples of an indication for content that has gone through dual recording as provided from the image outputting device.

In more detail, FIG. 18 is an overview illustrating examples of the indication for the content that has gone through dual recording as provided from the image outputting device 100. For reference, the examples shown in FIG. 18 are example indications offered when the content is simply searched rather than when the content is reproduced.

As shown in FIG. 18(*a*), the controller 180 can display the viewer's thumbnail image obtained upon dual recording together with the icon indicating the content and a thumbnail image of the content corresponding thereto, when the dual-recording function has been performed. In some instances, the controller 180 can provide only the viewer's thumbnail image obtained upon the dual recording.

As shown in FIG. 18(*b*), the controller 180 can provide an icon indicating that the dual-recording function has been performed at a region adjacent to an icon indicating the content. Further, the examples of the indication for indicating the dual recording are not limited to the example indication shown in FIG. 18.

Figure 19:
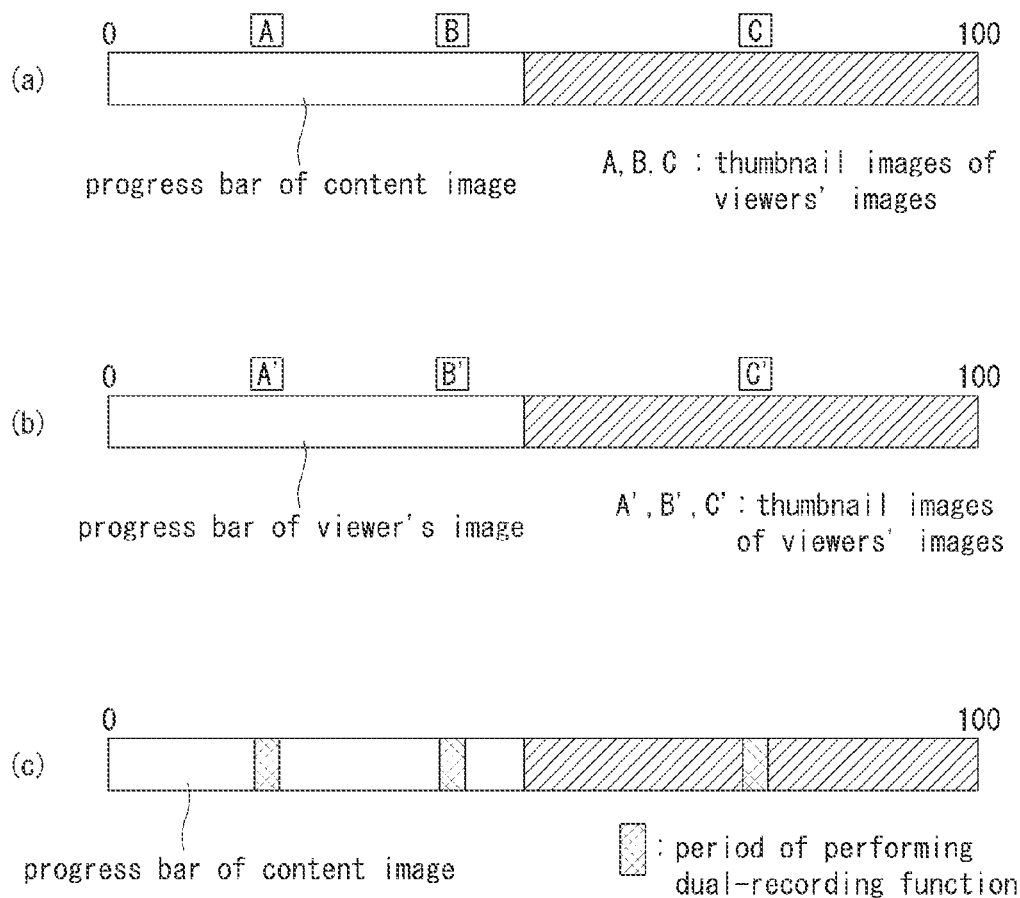
FIG. 19 is an overview illustrating example indications for indicating a dual-recording function provided from an image outputting device according to another embodiment of the present invention.

Next, FIG. 19 is an overview illustrating example indications for indicating performing a dual-recording function provided from the image outputting device 100 according to an embodiment of the present invention when the dual-recording function is performed while specific content is reproduced and then the content is reproduced. As shown in FIG. 19(*a*), when the specific content is reproduced, the image outputting device 100 can provide a thumbnail image of a viewer's image at a region adjacent to the period during which the dual-recording function has been performed on a progress bar, as an indication for indicating that the dual-recording function is performed.

As shown in FIG. 19(*b*), when the specific content is reproduced, the image outputting device 100 can provide a thumbnail image of the content image corresponding to the time of obtaining the thumbnail image of the viewer's image at a region adjacent to the period during which the dual-recording function has been performed on the progress bar, as an indication for indicating that the dual-recording function is performed.

Referring to FIG. 19(*c*), when the specific content is reproduced, the image outputting device 100 can indicate the period during which the dual-recording function has been performed by displaying the period during which the dual-recording function has been performed so the period is visually different from the other.

FIG. 20 is an overview illustrating various examples of indicating performing a dual-recording function in the image outputting device 100 according to an embodiment of the present invention when the dual-recording function has been performed targeting a plurality of viewers. Referring to FIG. 20(*a*), the image outputting device 100 can display a thumbnail image of a first viewer USER A on an upper end of the progress bar while displaying a thumbnail image of a second viewer USER B on a lower end of the progress bar. Further, the image outputting device 100 can make the indication for each viewer distinguished from the indication for another by using different colors or forms respectively corresponding to the viewers.

Referring to FIG. 20(*b*), the image outputting device 100 can display a thumbnail image of a specific viewer USER A on an upper end of a progress bar of a content image while displaying a thumbnail image of the content image on a lower end of the progress bar. The example shown in FIG. 20(*b*) may be when the dual recording has been performed on the specific viewer USER A only, rather than a plurality of viewers.

Referring to FIG. 20(*c*), the image outputting device 100 can display the thumbnail images of the viewers USER A and USER B on an upper end of the progress bar of the content image and display the thumbnail images of the content images corresponding to the thumbnail images of the viewers USER A and USER B on a lower end of the progress bar.

Next, FIG. 21 is an overview illustrating example searching functions provided from the image outputting device 100 according to an embodiment of the present invention. As shown in FIG. 21(*a*), the image outputting device 100 provides a searching function on a per-predetermined time basis with respect to the content. In addition, the image outputting device 100 can also provide a searching function on a per-predetermined time basis for the viewer's image.

As shown in FIG. 21(*b*), the image outputting device 100 can provide a searching function on a content image based on a time corresponding to a viewer's thumbnail image obtained as a result of performing a dual-recording function. Further, the image outputting device 100 can also provide a searching function on a viewer's image based on a time corresponding to the viewer's thumbnail image obtained as a result of performing the dual-recording function.

Figure 22:
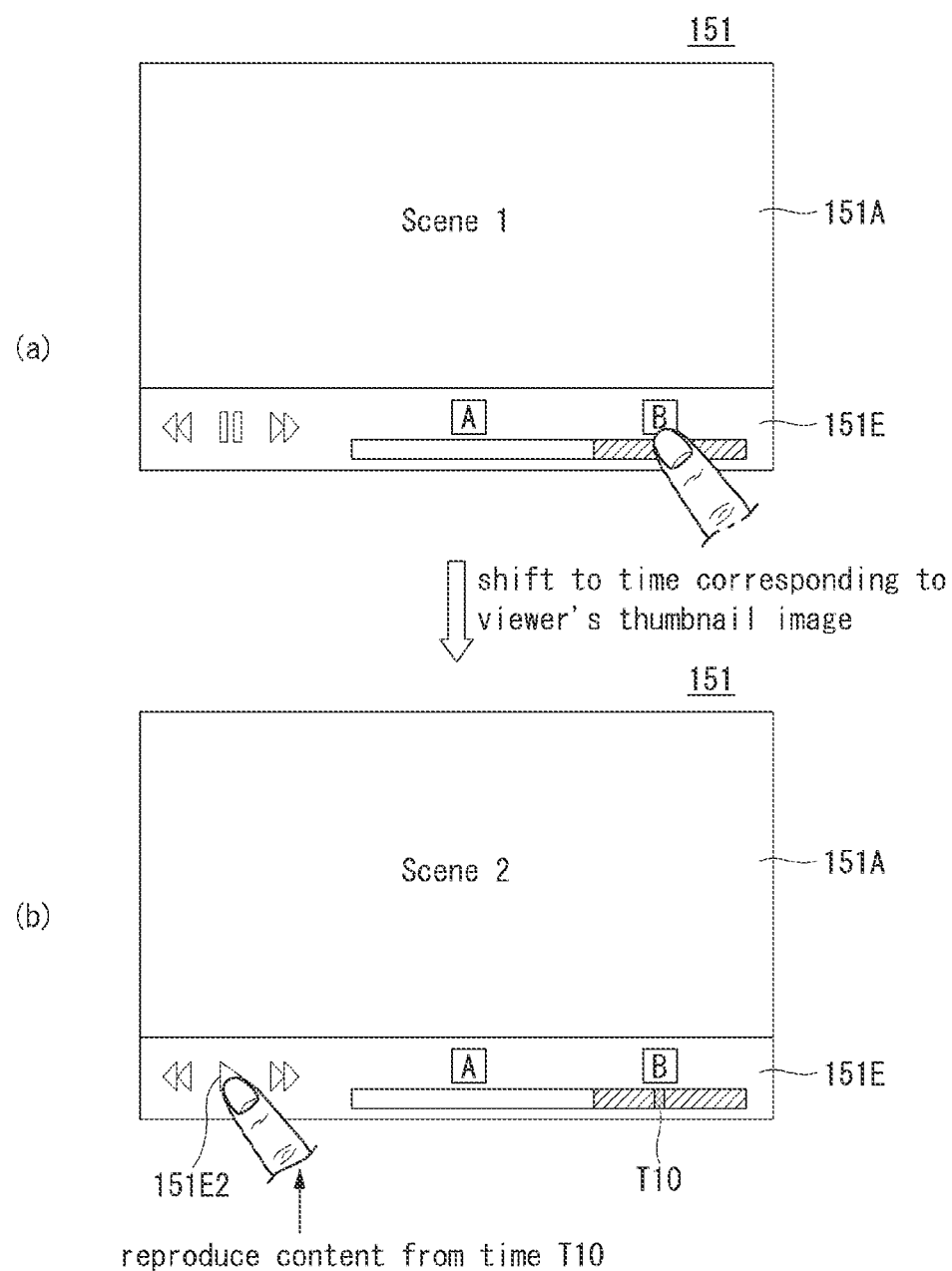
FIG. 22 is an overview illustrating an example searching function provided from an image outputting device according to an embodiment of the present invention.

Next, FIG. 22 is an overview illustrating an example searching function provided from the image outputting device 100 according to an embodiment of the present invention. In particular, FIG. 22(*a*) shows an example in which a viewer selects the viewer's thumbnail image provided as an indication when specific content is reproduced after a dual-recording function is performed while the specific content is being reproduced.

FIG. 22(*b*) shows the controller 180 then performs a searching function on an image corresponding to a thumbnail image selected among the images of the specific content. Accordingly, the image displayed on the display unit 151 is changed from scene 1 to scene 2. Under such state, as shown in FIG. 22(*b*), if a reproduction button 151E2 is selected, the controller 180 can reproduce the specific content from the searched time. In contrast, the controller 180 can also reproduce the specific content immediately from the searched time.

Figure 23:
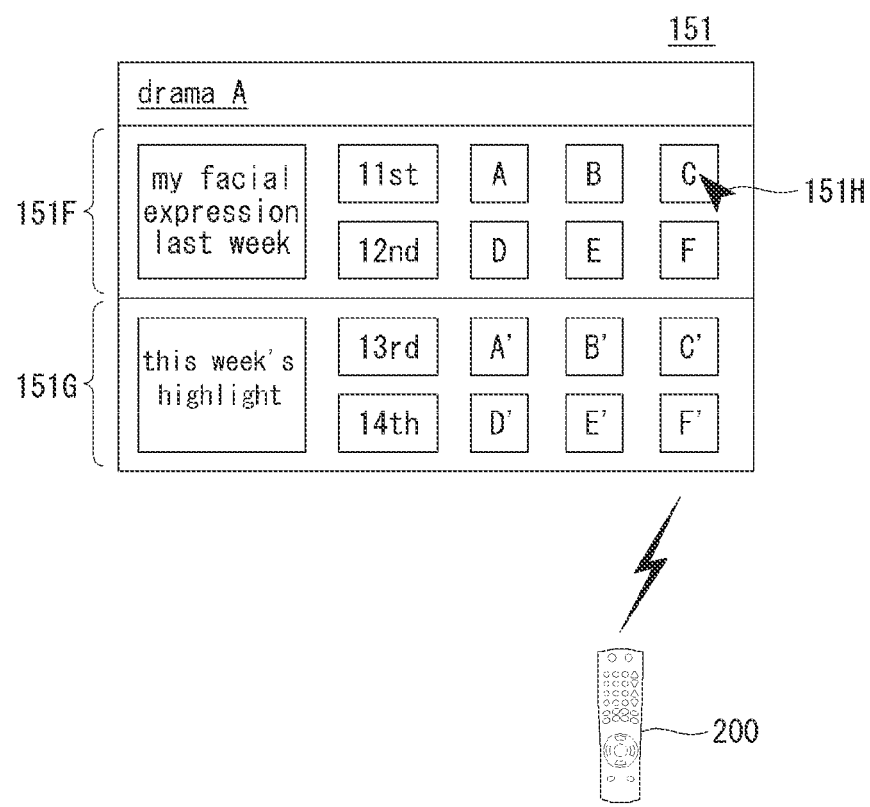
FIG. 23 is an overview illustrating an example dual-recording function-related function provided from an image outputting device according to an embodiment of the present invention.

Next, FIG. 23 is an overview illustrating an example dual-recording function-related function provided from an image outputting device 100 according to an embodiment of the present invention. As shown in FIG. 23, the image outputting device 100 can provide a viewer thumbnail image 151 obtained as a result of performing a dual-recording function on a drama episode already viewed, when the viewer desires to view a specific drama.

In this instance, the viewer can control the position of a cursor 151H through a remote controller and select a specific thumbnail image. The image outputting device 100 can then provide a content image or viewer's image corresponding to the selected thumbnail image. Further, the image outputting device 100 can provide a highlight image 151G for this week's drama episode.

Figure 24:
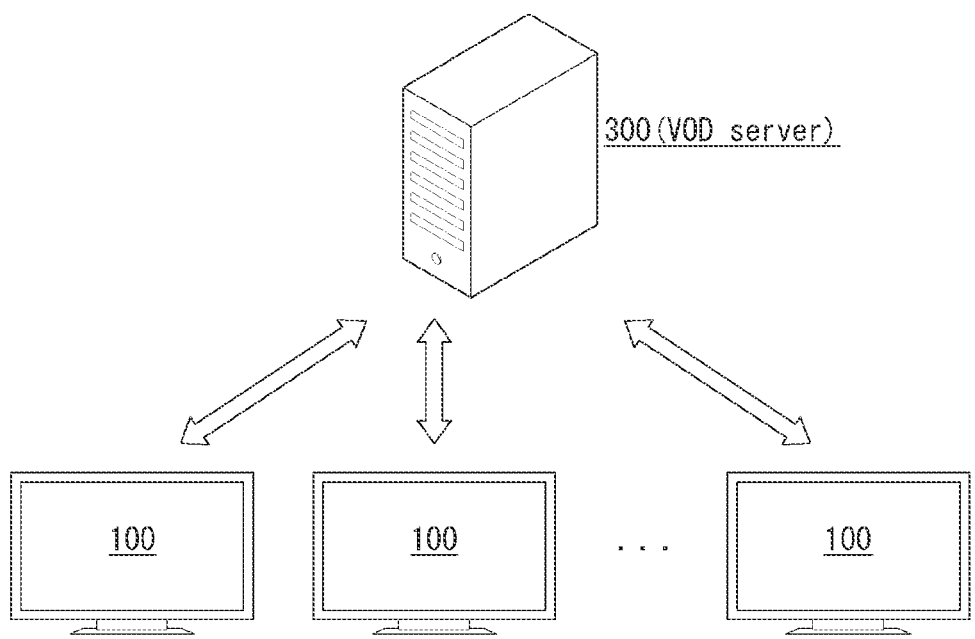
FIG. 24 is an overview illustrating a content providing system according to an embodiment of the present invention.

FIG. 24 is a view illustrating a content providing system according to an embodiment of the present invention. Referring to FIG. 24, the system may include a VOD providing server 300 and a plurality of image outputting devices 100 connected with the VOD providing server 300. The image outputting devices 100 can provide a dual-recording function as described above.

Figure 25:
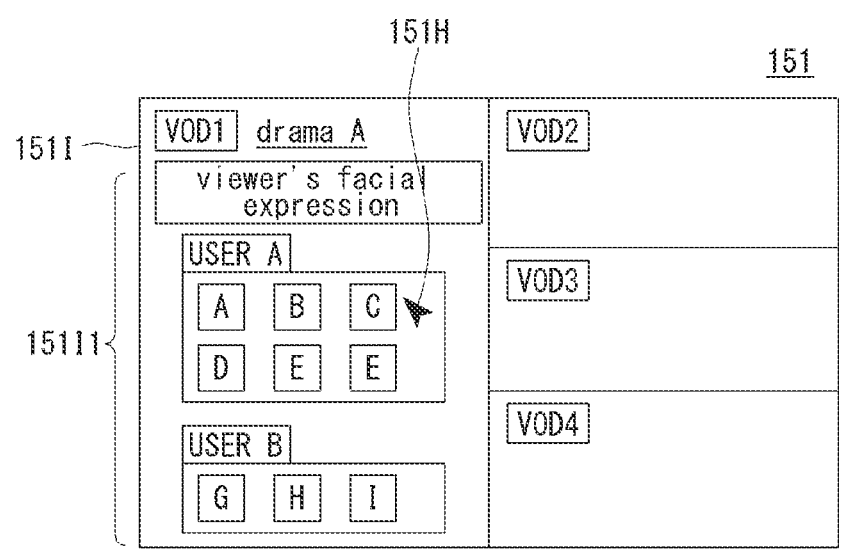
FIG. 25 is an overview illustrating displaying a result of performing a dual-recording function on a plurality of viewers for a specific drama in interoperation with the Video On Demand (VOD) providing server.

Next, FIG. 25 is an overview illustrating an example in which the image outputting device 100 according to an embodiment of the present invention displays a result 1511 of performing a dual-recording function on a plurality of viewers for a specific drama in interoperation with the VOD providing server 300. As shown in FIG. 25, the image outputting device 100 can receive thumbnail images 15111 for the viewers, obtained as a result of performing the dual-recording function on the specific drama, from the VOD providing server 300 and display the thumbnail images on the display unit 151.

The plurality of viewers may be viewers registered as acquaintances of the viewer of the image outputting device 100. Such acquaintance registration may be conducted based on the acquaintance relationship on an SNS service or may be based on the acquaintance relationship on the viewer's cell phone or smartphone. The viewer of the image outputting device 100 can then refer to the facial expressions made by the plurality of viewers when watching the specific drama in determining whether to view the drama. Further, the image outputting device 100 can also receive, from the VOD providing server 300, various dual recording-related data other than the facial expressions made by the plurality of viewers while watching the specific drama and may provide the data.

Figure 26:
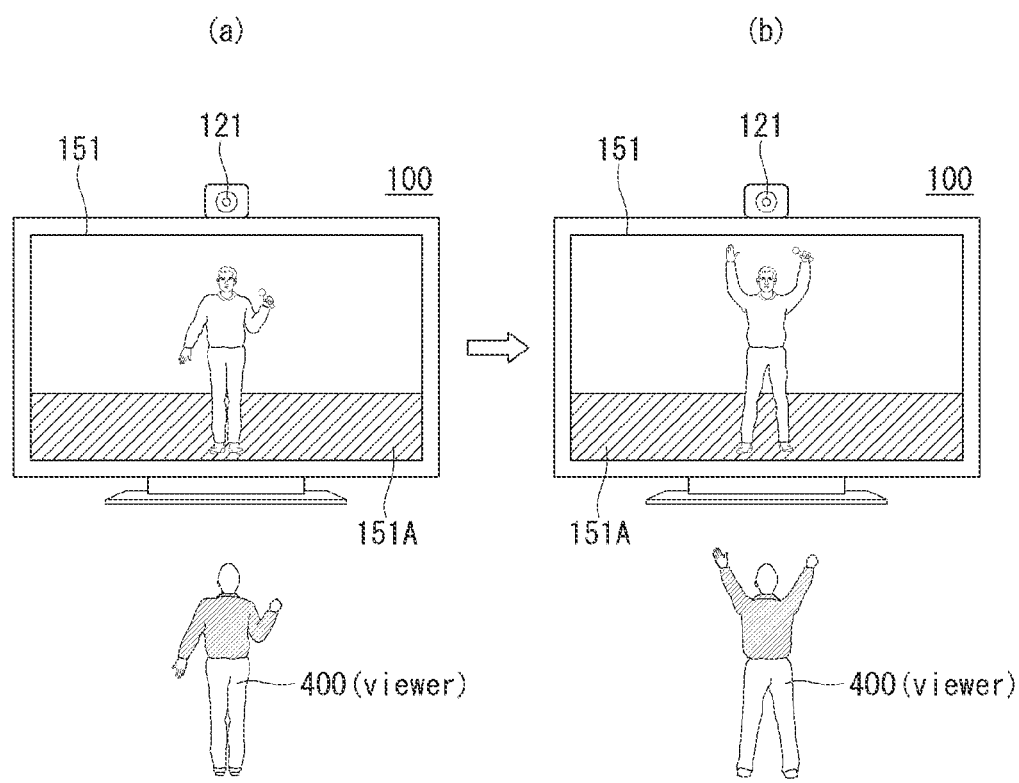
FIGS. 26 and 27 are overviews illustrating automatically performing a dual-recording function in an image outputting device according to an embodiment of the present invention.
Figure 27:
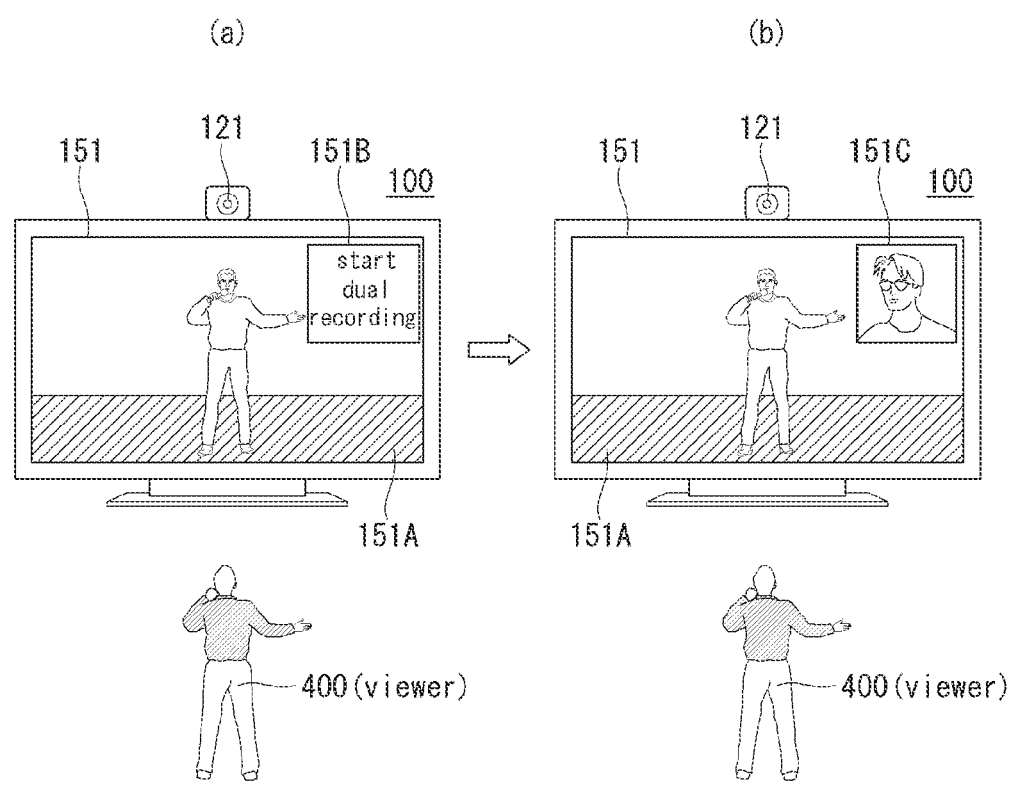

Next, FIGS. 26 and 27 include overviews illustrating an example of automatically performing a dual-recording function in an image outputting device 100 according to an embodiment of the present invention. As shown in FIGS. 26(a) and (b), a viewer 400 copies the behavior of a specific human being contained in the image of the specific content displayed on the display unit 151. In this instance, the image outputting device 100 can analyze the image obtained through the camera 121 to recognize that the viewer 400 copies the behavior of the specific human being.

Upon recognizing that the viewer 400 copies the behavior of the specific human being, the image outputting device 100 can automatically execute a dual-recording function. At this time, the image outputting device 100 can display on the screen 151 a message 151B indicating that the dual recording is initiated, as shown in FIG. 27(a). Then, the image outputting device 100 can display on the display unit 151 a captured image 151C of the viewer 400, obtained through the camera 121, as shown in FIG. 27(b). Further, the image outputting device 100 can automatically perform the dual-recording function when the specific human being displayed on the screen 151 makes a predetermined behavior.

Each of the methods of driving a mobile terminal according to an embodiment of the present invention, as described above, may be implemented in a program that may be executed by various computing methods and may be recorded in a computer readable medium. The computer readable medium may include, alone or in combination, a program command, a data file, and/or a data architecture.

The computer readable recording medium may include, for example, magnetic media, such as hard disks, floppy disks, and magnetic tapes, optical recording media, such as CD-ROMs and DVDs, magneto-optical media such as optical disks, ROMs, RAMS, flash memories, and other hardware devices specially configured to store and execute program commands. The program may include, for example, machine language codes created by a compiler, as well as high level language codes that may be executed by a computer using an interpreter. The hardware devices may be configured in one or more software modules for performing the operation according to an embodiment of the present invention, and vice versa.

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An image outputting device, comprising:
a camera configured to obtain a viewer's image;
a display configured to reproduce content; and
a controller configured to:
set up a specific condition of a dual-recording function;
reproduce the content and display the content on a whole screen of the display;
perform the dual-recording function for recording both the viewer's image obtained by the camera and the content being reproduced, and further display the viewer's image on a partial area overlapped with the content when the specific condition of the dual-recording function is satisfied; and
generate a dual-recording image by performing the dual-recording function and store the dual-recording image,
wherein the specific condition is determined by at least one of a highlight period among additional information of the content, a specific word among caption information of the content, a facial expression of the viewer and a predetermined gesture.

2. The image outputting device of claim 1, further comprising:
a microphone configured to receive a sound signal,
wherein the controller is further configured to:
record the sound signal received through the microphone during a period when the dual-recording function is performed, and
store the recorded sound signal separately from a sound signal of the content being reproduced.

3. The image outputting device of claim 1, wherein the controller is further configured to store the viewer's image recorded as a result of performing the dual-recording function in combination with an image of the content being reproduced or independently from the content being reproduced.

4. The image outputting device of claim 1, wherein the controller is further configured to display a user interface for identifying whether the dual-recording function is performed.

5. The image outputting device of claim 1, wherein the controller is further configured to exchange a display area of the content and a display area of the viewer's image during the dual-recording function being performed.

6. The image outputting device of claim 1, wherein the controller is further configured to terminate the dual-recording function when a predetermined time passes from a satisfaction time point of the specific condition.

7. The image outputting device of claim 1, wherein the controller is further configured to display a progress bar of the content and an indicator or a thumbnail image of the viewer's image on the progress bar corresponding to a region where the dual-recording function is performed when the stored dual-recording image is reproduced.

8. The image outputting device of claim 1, wherein the controller is further configured to display a message for inquiring whether to add an additional viewer to be subjected to the dual-recording function when the additional viewer is recognized.

9. The image outputting device of claim 1, wherein the controller is further configured to display an indicator on the stored dual-recording image.

10. The image outputting device of claim 1, wherein the controller is further configured to perform a fast forward function of the content to a time point of the dual-recording image and when the fast forward function is selected.

11. A method of controlling an image outputting device, the method comprising:
    setting up a specific condition of a dual-recording function;
    reproducing, on a display of the image outputting device, the content and displaying the content on a whole screen of the display;
    performing, via a controller of the image outputting device, the dual-recording function for recording both the viewer's image obtained by a camera and the content being reproduced, and further displaying the viewer's image on a partial area overlapped with the content when the specific condition of the dual-recording function is satisfied; and
    generating a dual-recording image by performing the dual-recording function and storing the dual-recording image,
    wherein the specific condition is determined by at least one of a highlight period among additional information of the content, a specific word among caption information of the content, a facial expression of the viewer and a predetermined gesture.

12. The method of claim 11, further comprising displaying a user interface for identifying whether the dual-recording function is performed.

13. The method of claim 11, further comprising exchanging a display area of the content and a display area of the viewer's image while the dual-recording function is performed.

14. The method of claim 11, further comprising terminating the dual-recording function when a predetermined time passes from a satisfaction time point of the specific condition.

* * * * *